Dec. 20, 1960     G. L. CLAYBOURN ET AL     2,965,810
CIRCUIT BREAKER TRIP CIRCUITS
Filed Jan. 3, 1955

INVENTORS
Guy W. Champney
and Glen L. Claybourn
BY
Ralph H Swingle
ATTORNEY

Dec. 20, 1960   G. L. CLAYBOURN ET AL   2,965,810
CIRCUIT BREAKER TRIP CIRCUITS
Filed Jan. 3, 1955   4 Sheets-Sheet 2

WITNESSES:
E. A. McCloskey
F. V. Giolma

INVENTORS
Guy W. Champney
and Glen L. Claybourn.
BY Ralph H. Swingle
ATTORNEY

Dec. 20, 1960  G. L. CLAYBOURN ET AL  2,965,810
CIRCUIT BREAKER TRIP CIRCUITS

Filed Jan. 3, 1955

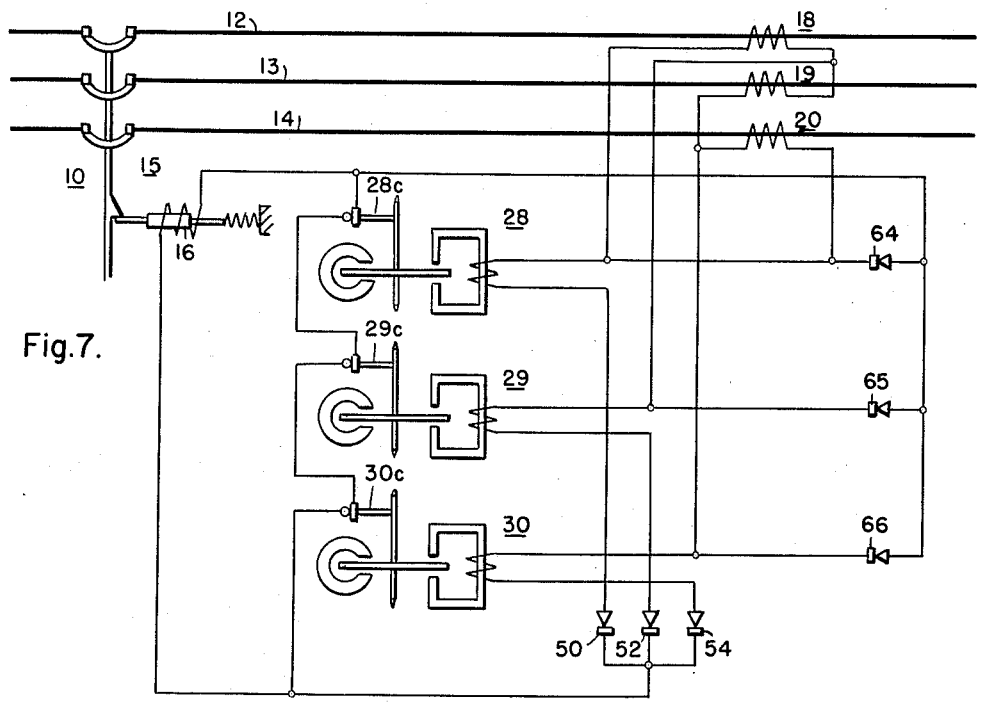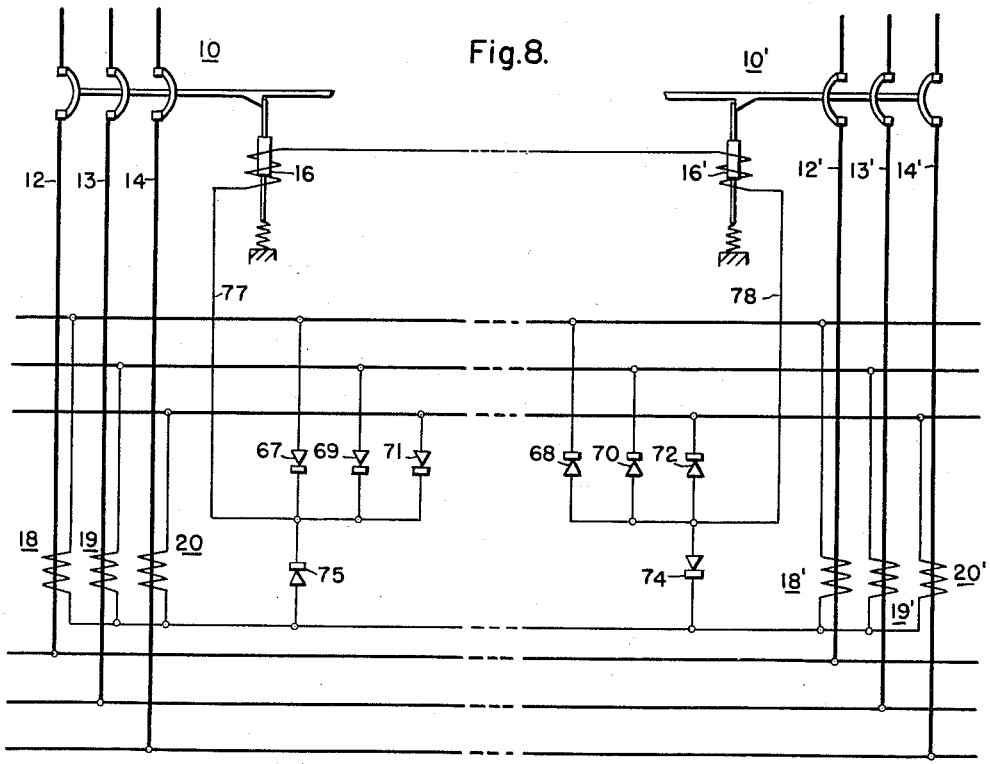

United States Patent Office 2,965,810
Patented Dec. 20, 1960

2,965,810

CIRCUIT BREAKER TRIP CIRCUITS

Glen L. Claybourn, Pittsburgh, and Guy W. Champney, Pitcairn, Pa., assignors to Westinghouse Electric Corporation, East Pittsburgh, Pa., a corporation of Pennsylvania Filed Jan. 3, 1955, Ser. No. 479,466

1 Claim. (Cl. 317—57)

Our invention relates generally to circuit interrupters and has reference in particular to trip circuits using the energy of the fault current for directly tripping circuit breakers.

Many power distribution circuits have circuit breakers which are so isolated that it is impractical to provide direct current control power from the station battery for tripping them. Other types of tripping circuits have been used which are expensive and of limited reliability.

During a fault on a power circuit the voltage of the circuit is usually unstable, and may even decay to zero. Any tripping device depending on this voltage for its driving energy is either inoperative, or very unreliable when most needed. However, during a fault, the fault current rises rapidly and may reach a value of from 5 to 20 times rated current. A tripping circuit which utilizes this fault current rectified for the driving energy to operate a direct current trip device for tripping the circuit breaker, will provide a circuit of maximum reliability at the most critical time for circuit protection. Such a trip circuit permits the use of a single trip element for a polyphase breaker, offers a minimum burden on the current transformers, and the maximum utilization of the fault energy for driving the trip device. Phase to ground, and phase to phase fault protection is provided, as is also protection when all phases are short circuited.

Generally stated, it is an object of our invention to provide for using the energy of the fault current in an alternating-current circuit for energizing a direct-current trip device.

More specifically, it is an object of our invention to provide in an alternating-current circuit breaker control system for using calibrated fault relays in conjunction with a normally shunted trip current circuit for accurate tripping of the breaker in response to fault conditions.

Yet another object of our invention is to provide in a polyphase circuit breaker control system for using a single direct-current trip device which is energized by the fault current in the several phases.

It is also an important object of our invention to provide for using current transformers in each of the phases of a polyphase circuit and connecting them to a common direct-current trip circuit through rectifiers.

Another important object of our invention is to provide in a control system for a circuit breaker, for utilizing a plurality of different types of fault responsive devices for removing a shunting circuit from a direct-current trip circuit.

Yet another object of our invention is to provide for using the fault energy in an alternating-current system for directly energizing a trip device of a circuit breaker.

It is a further object of our invention to provide a simple and reliable trip means for an alternating current circuit breaker with the driving energy to actuate the trip means being supplied from the fault current, rectified.

Yet a further object of the invention is to provide a trip circuit which does not require a battery or capacitor source, but derives its energy from the fault current in the circuit during the existence of the fault.

It is also another object of our invention to provide for directly connecting the trip coil of a circuit breaker in a trip circuit deriving its energy from the fault current, and for normally shunting the trip coil to prevent tripping the breaker until the fault current reaches a predetermined value as determined by calibrated relays.

Other objects will in part be obvious, and will in part be explained hereinafter.

In practicing our invention in accordance with one of its embodiments, current transformers in each phase of a polyphase alternating-current system are connected through full-wave rectifiers to the trip winding of a single direct-current trip device for an alternating-current circuit breaker. Overcurrent relays are connected in circuit with each of the current transformers, having normally closed contacts connected in series circuit relation to provide a shunt circuit about the trip winding for insuring accurate tripping of the breaker.

For a more complete understanding of the nature and the scope of our invention, reference may be made to the following detailed description, which may be read in connection with the accompanying drawings, in which:

Fig. 7 is a diagrammatic view of a trip system embodying the invention in a regular delta circuit; and Fig. 8 is a diagrammatic view of a differential feeder circuit embodying the invention in one of its forms.

Figure 1:
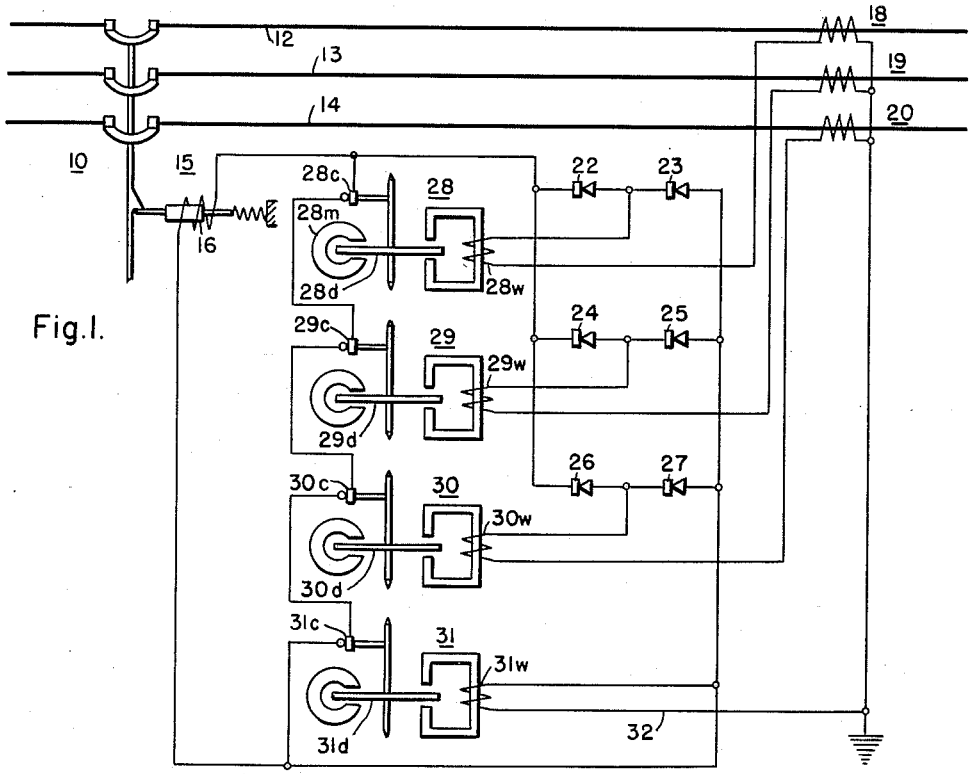
Figure 1 is a diagrammatic view of a trip circuit embodying the invention in one of its forms.

Referring to Fig. 1, the reference numeral 10 may denote generally a circuit breaker connected in a polyphase alternating-current circuit comprising conductors 12, 13 and 14, respectively. The circuit breaker may be of any suitable type and is herein shown schematically as being maintained in the closed position by means of a single trip device 15 having an operating winding 16 which is energized to effect opening of the circuit breaker.

In order to effect tripping of the circuit breaker in response to overcurrent conditions, current transformers 18, 19 and 20 are associated with the conductors 12, 13 and 14 to provide currents responsive to fault conditions in the conductors. These current transformers are Y-connected, one terminal of each being connected to ground, and the other terminals being connected to points intermediate pairs of similarly poled rectifier devices 22—23, 24—25 and 26—27, respectively. These pairs of rectifier devices are connected across the trip winding 16, so that each of the current transformers is connected to supply direct current to the trip winding 16 in response to an overcurrent in its respective line conductor.

In order to provide for accurate time delayed tripping of the circuit breaker 10, time delayed overcurrent relays 28, 29, 30 and 31, which may be of the induction type, may be provided, having operating windings $28w$, $29w$, $30w$ and $31w$ connected between the current transformers and their associated rectifier devices and in the common return connection 32 of the current transformers, respectively. These relays are of a well-known type and have rotating disc elements $28d$, $29d$, $30d$ and $31d$ actuated in response to current through the operating winding for actuating contact arms 28c, 29c, 30c and 31c, respectively, to interrupt a shunt circuit including all of these contacts connected in series, which normally shunts the operating winding 16.

When an overcurrent occurs in one of the conductors, for example the conductor 12, the current transformer 18 produces a current proportional to the fault current. This current flows through the operating winding 28w and attempts to start the disc element 28d rotating to interrupt the shunt circuit at contact 28c. At the same time, a direct-current is applied to the parallel circuit of the trip winding 16 and the shunt circuit, through the rectifiers 22 and 23. Since the disc 28d is provided with a time delay damping magnet 28m, movement of the disc is relatively slow and the shunt circuit about the trip winding 16 will not be interrupted for a predetermined time, dependent on the value of the fault current. When the contacts 28c interrupt the circuit, the trip winding 16 is energized by a direct-current derived from the fault current and operates the single trip device 15 to trip the circuit breaker 10. In the event of a ground fault, the relay 31, which may be set for a much lower value current, will operate to remove the shunt and effect tripping.

Figure 2:
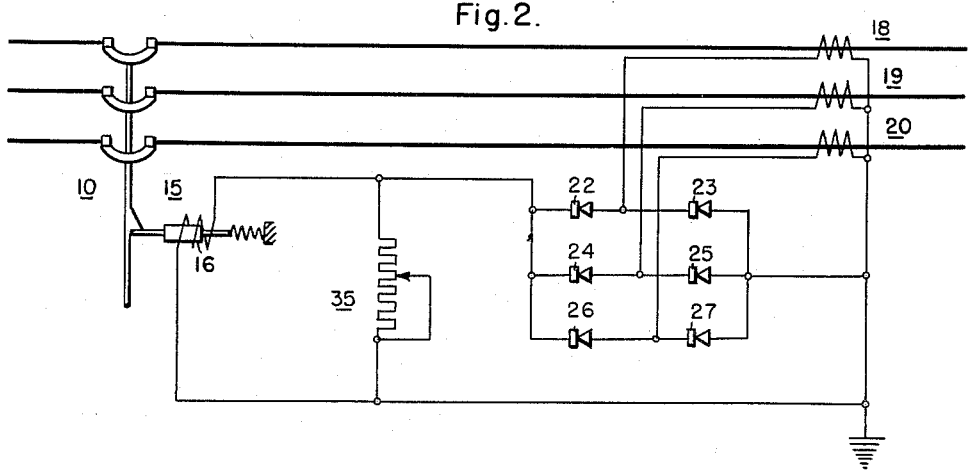
Fig. 2 is a diagrammatic view of a circuit breaker trip circuit embodying the invention in another of its forms.

Referring to Fig. 2, it will be seen that the trip winding 16 of the trip device 15 is again directly energized from the current transformers 18, 19 and 20 through pairs of rectifier devices 22—23, 24—25 and 26—27 for tripping the circuit breaker 10. The trip device 15 is calibrated by means of a rheostat or adjustable impedance 35 connected in shunt with the trip winding 16. This provides for operating the trip device in response to a predetermined fault current, with a greater accuracy than can be obtained by the calibration of the coil alone.

Figure 3:
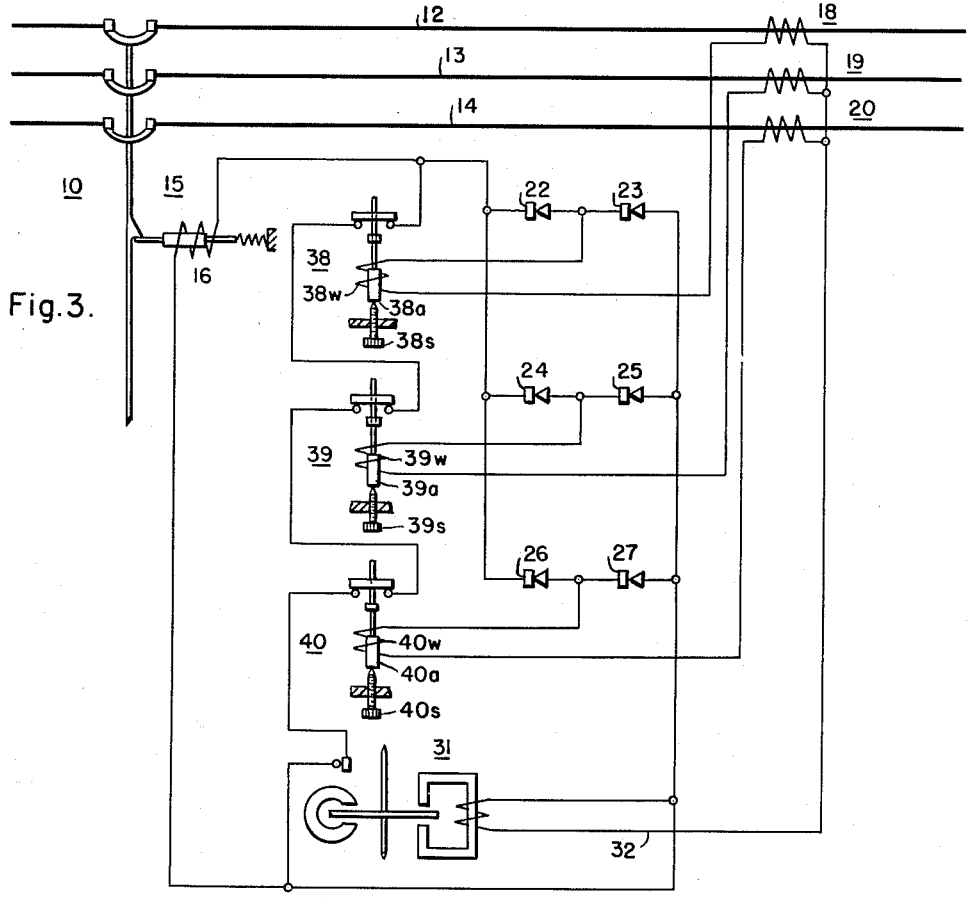
Fig. 3 is a diagrammatic view of yet another trip circuit embodying the invention.

Referring to Fig. 3 of the drawings, the circuit breaker 10 is again provided with a trip device 15 having a trip winding 16. Current for operating the trip device 15 is derived from the fault current in the conductors 12, 13 and 14 by means of current transformers 18, 19 and 20, which current is applied to the trip winding 16 through rectifier devices 22—23, 24—25 and 26—27 in the same manner as described in connection with the circuit of Fig. 1. The common or return conductor 32 of the current transformers 18, 19 and 20 is provided with an induction time delay overcurrent device 31 as was the circuit shown in Fig. 1. Instead of utilizing similar time delay devices in connection with the transformers 18, 19 and 20, as in the circuit of Fig. 1, instantaneous trip devices 38, 39 and 40 of the solenoid type having trip windings 38w, 39w and 40w are provided for controlling a shunt circuit about the trip winding 16. The armatures 38a, 39a and 40a may be provided with adjusting screws 38s, 39s and 40s, respectively, for adjusting the rest position of the armatures so as to in effect calibrate the trip device for different definite values of overcurrent. In response to a fault in any one of the line conductors of the required predetermined value, the associated trip device operates instantaneously to remove the shunt about the trip winding 16, so as to permit energization of the trip winding and instantaneous tripping of the circuit breaker.

Figure 4:
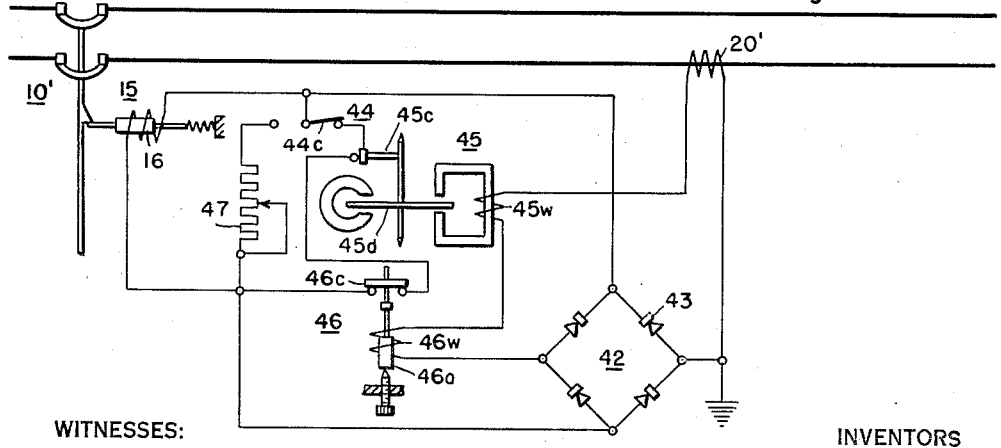
Fig. 4 is a diagrammatic view of a trip circuit for a circuit breaker employed in a single phase circuit.

Referring to Fig. 4, it will be seen that a single phase circuit breaker 10' is provided with a trip device 15 having a trip winding 16. A current transformer 20' is connected to the trip winding 16 through a full-wave bridge circuit 42 of rectifier devices 43 for utilizing the energy of the fault current for opening the circuit breaker. A time delay overcurrent device 45 of the induction type, for example, having an operating winding 45w for operating a disc element 45d to actuate a movable contact member 45c, is connected in series circuit with the current transformer 20', as is also an instantaneous trip device 46 having an operating winding 46w and an armature 46a for actuating a contact member 46c. The contact members 45c and 46c are connected in series circuit relation, and a selector switch 44 having a contact member 44c is utilized to either connect a calibrating resistor 47 in shunt with the trip winding 16 for effecting operation of the trip device 15 in response to a predetermined fault current, or for connecting the series arrangement of contacts 45c and 46c in shunt with the trip winding 16, so as to provide for either calibrating the trip winding 16 by means of resistor 47 for opening the circuit breaker 10' in response to a definite fault current, or connecting the relays 45 and 46 for opening the breaker after a predetermined time delay or in response to operation of the instantaneous trip device depending on the setting of the trip device 46 and the value of the fault current. It will be understood that instead of using both the relays 45 and 46, either one may be used alone, or if used together, the time delay relay 45 may be set for a relatively low value of fault current, and the relay 46 set for an extremely high value.

Figure 5:
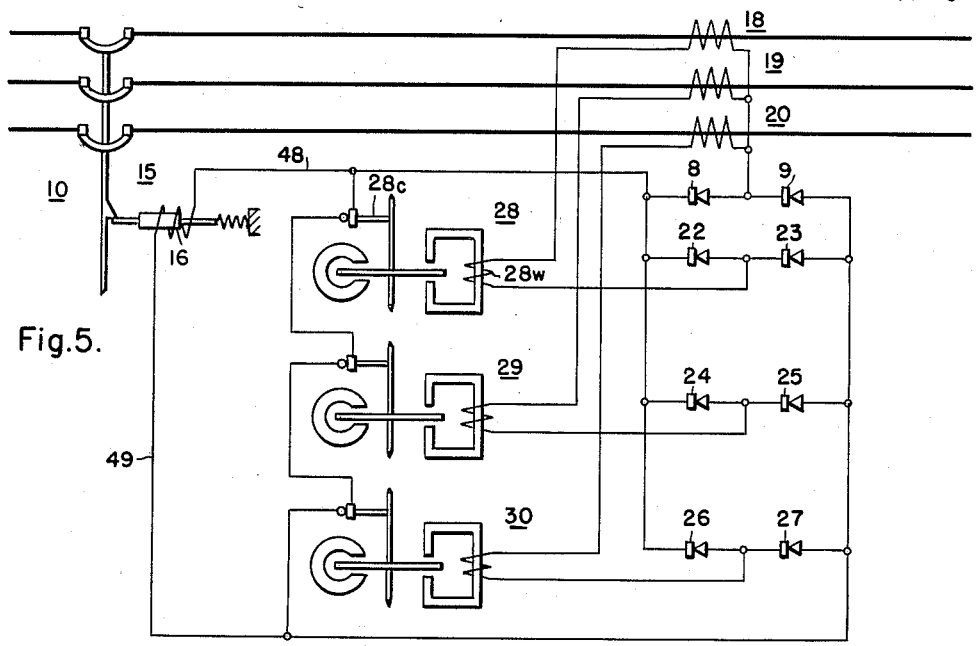
Fig. 5 is a diagrammatic view of a system similar to that of Fig. 1 embodying the invention in another form.

Referring to Fig. 5, it will be seen that relays 28, 29 and 30 of the time delay type have operating windings 28w, 29w and 30w connected in series with Y-connected transformers 18, 19 and 20, which are connected to intermediate points of pairs of similarly poled rectifier devices 22—23, 24—25 and 26—27 connected in shunt with the trip winding 16 of trip device 15 of circuit breaker 10, as in Fig. 1. Instead of connecting the common of the Y connection directly to one side of the trip winding and pairs of rectifier devices as in Fig. 1, an additional pair of rectifier devices 8—9 is provided, connected in parallel with the other pairs, and the common leg of the Y connection is connected to a point intermediate the rectifier devices 8—9. A ground fault relay can be connected as in Fig. 1, if desired.

When a fault occurs, and one of the relays 28, 29 or 30, operates, direct current is supplied to the trip winding 16 on both half cycles of the alternating current, from, for example, the left-hand terminal of transformer 18 through winding 28w, rectifier device 22, conductor 48, trip winding 16, conductor 49, and rectifier device 9, back to the right-hand terminal. On the next half cycle, the circuit may be traced from the right-hand terminal, through rectifier device 8, conductor 48, trip winding 16, conductor 49, rectifier device 23, and winding 28w back to the left-hand terminal of transformer 18. Thus, when a fault occurs and the relay 28 opens its contacts, the trip winding is energized by direct current derived from the fault current.

Figure 6:
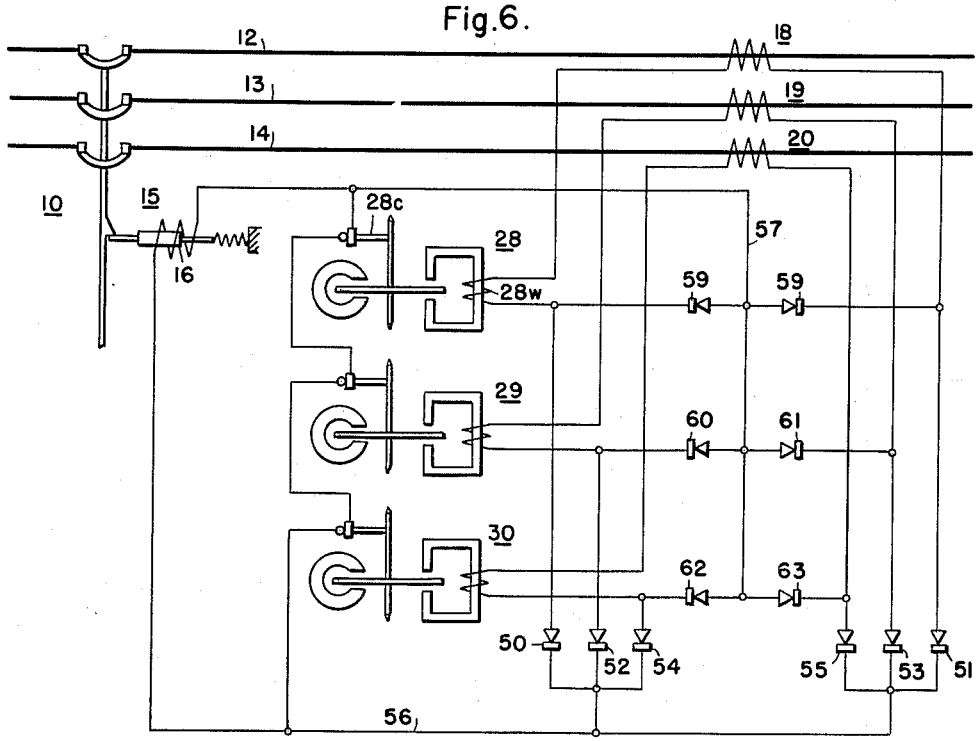
Fig. 6 is a diagrammatic view of a trip system embodying the invention in an equivalent delta-connected current transformer circuit.

Referring to Fig. 6, the current transformers 18, 19 and 20 are shown connected in a maximum current network or equivalent delta for supplying electrical energy to the trip winding 16. In this instance, pairs of rectifier devices 50—51, 52—53 and 54—55 are connected on opposite sides of the transformers and their respective relays in opposed relation, and to a common conductor 56 which connects to one terminal of the trip winding 16. The other terminal is connected by a conductor 57 to intermediate points of pairs of oppositely disposed rectifier devices 58—59, 60—61 and 62—63 connected in closed circuit with the respective transformers and relays.

In the event of a fault on conductor 12, the relay 28 will operate, opening contact 28c, and the trip winding 16 will be energized as follows: from the left-hand terminal of transformer 18, through winding 28w, rectifier device 50, conductor 56, trip winding 16, conductor 57, and rectifier device 59, to the right-hand terminal: from the right-hand terminal through rectifier device 51, conductor 56, trip winding 16, conductor 57, rectifier device 58 and winding 28w, to the left-hand terminal.

Referring to Fig. 7, it will be seen that the current transformers 18, 19 and 20 are connected in a true delta for supplying energy to the trip winding 16 of trip device of breaker 10. Relays which may be either instantaneous or of the time delay type, such as relays 28, 29 and 30, are connected between the terminals of the delta and rectifiers 50, 52 and 54 connected to a common junction. The trip winding 16 is connected between such common junction and the common return junction of rectifiers 64, 65 and 66 which connect back to the delta terminals. Contacts 28c, 29c and 30c normally shunt the winding 16, but open in response to a fault current of the predetermined value to effect energization of the trip winding.

Referring to Fig. 8, circuit breakers 10 and 10' are shown connected in alternating current feeder circuits comprising conductors 12—13—14 and 12'—13'—14' supplying a common bus. Differential protection is provided by using Y-connected current transformers 18—19—20 and 18'—19'—20'. The trip windings 16 and 16' are connected across the groups of transformers through oppositely disposed rectifier devices 67—68, 69—70 and 71—72, in conjunction with oppositely disposed common rectifier devices 74—75. Other feeder circuits and their current transformers may be similarly connected with the trip winding of the respective breakers, being added to the circuit of the trip windings shown, in the region indicated by the dotted conductors.

Normally in the differential circuit of Fig. 8 there is no current in the trip circuit. In the event that fault occurs within the protected zone, a differential current occurs, for example, between the outputs of transformers 18 and 18', and current will flow on one half cycle from the upper terminal of transformer 18 through rectifier device 67, conductor 77, trip windings 16 and 16', conductor 78, rectifier device 74 back to the lower terminal: on the next half cycle it will flow from the lower terminal through rectifier device 75, conductor 77, trip windings 16 and 16', conductor 78 and rectifier device 68 back to the upper terminal. If the unbalance is in the opposite direction, current will flow from the transformer 18' through similar paths. This arrangement may be used in the protection of apparatus such as generators and transformers, as well as for bus protection. No special differential relays are required, the trip windings being energized directly by the differential fault current.

From the above description and the accompanying drawing, it will be apparent that we have provided in a simple and reliable manner means for tripping an alternating-current circuit breaker during the existence of a fault condition. The driving energy to actuate the trip device is supplied from the fault current in the circuit, and is rectified so as to permit the use of a single trip device for a plurality of phase circuits. Trip circuits embodying the features of our invention fail safe in the event of a contact failure in the shunt bypass circuit. Either time delay or definite fault current tripping may be readily effected, either using calibrated relays or a calibrating impedance for calibrating the trip winding to obtain accurate tripping of the circuit breaker.

Since certain changes may be made in the above-described construction and different embodiments of the invention may be made without departing from the spirit or scope thereof, it is intended that all the matter contained in the above description and shown in the accompanying drawings shall be construed as illustrative, and not in a limiting sense.

We claim as our invention:

In a trip circuit for a polyphase circuit breaker having a single trip winding, a current transformer for each line conductor of a polyphase circuit, a pair of series connected rectifier devices corresponding to each conductor, each pair of rectifier devices connected in shunt with the trip winding, a relay for each conductor having a winding connected between one terminal of the corresponding transformer and an intermediate point of the pair of corresponding rectifier devices and having normally closed contacts, an additional pair of similarly disposed rectifier devices connected across the trip winding, circuit means connecting another terminal of each transformer to an intermediate point of said additional pair of rectifier devices, and a shunt across the trip winding including said normally closed contacts.

References Cited in the file of this patent

UNITED STATES PATENTS

| | | |
|---|---|---|
| 714,181 | Hilliard | Nov. 25, 1902 |
| 1,134,752 | Leonard | Apr. 6, 1915 |
| 1,154,359 | Basch | Sept. 21, 1915 |
| 1,973,538 | Moffett | Sept. 11, 1934 |
| 1,980,395 | Fitzgerald | Nov. 13, 1934 |
| 2,056,040 | Dozler | Sept. 29, 1936 |
| 2,242,950 | Harder | May 20, 1941 |
| 2,309,433 | Anderson | Jan. 26, 1943 |
| 2,354,158 | Taliaferro | July 18, 1944 |
| 2,361,208 | Hunt | Oct. 24, 1944 |
| 2,548,625 | Seeley | Apr. 10, 1951 |
| 2,608,606 | Sonneman | Aug. 26, 1952 |